United States Patent [19]
Ohnsorge

[11] Patent Number: 5,485,504
[45] Date of Patent: Jan. 16, 1996

[54] HAND-HELD RADIOTELEPHONE WITH VIDEO TRANSMISSION AND DISPLAY

[75] Inventor: Horst Ohnsorge, Freiberg, Germany

[73] Assignee: Alcatel N.V., Amsterdam, Netherlands

[21] Appl. No.: 366,429

[22] Filed: Dec. 30, 1994

Related U.S. Application Data

[63] Continuation of Ser. No. 913,397, Jul. 15, 1992, abandoned.

[30] Foreign Application Priority Data

Aug. 7, 1991 [DE] Germany ............... 41 26 105.4

[51] Int. Cl.⁶ .................. H04M 11/00; H04N 7/14; H04N 7/15
[52] U.S. Cl. .............. 379/58; 379/59; 379/61; 348/14; 348/15; 348/16; 348/17
[58] Field of Search .................. 379/58, 59, 61, 379/94, 110; 348/14–17

[56] References Cited

U.S. PATENT DOCUMENTS

| | | | |
|---|---|---|---|
| 4,258,387 | 3/1981 | Lemelson et al. | 379/53 |
| 4,856,045 | 8/1989 | Hoshina | 379/53 |
| 4,882,766 | 11/1989 | Akaiwa | 379/62 |
| 4,893,326 | 1/1990 | Duran | 348/14 |
| 4,928,300 | 5/1990 | Ogawa et al. | 358/85 |
| 5,023,931 | 6/1991 | Streck et al. | 455/21 |
| 5,050,138 | 9/1991 | Yamada et al. | 379/110 |
| 5,077,784 | 12/1991 | Fujita et al. | 379/53 |
| 5,079,627 | 1/1992 | Filo | 379/53 |
| 5,111,498 | 5/1992 | Guichard et al. | 379/53 |
| 5,164,980 | 11/1992 | Bush et al. | 379/53 |
| 5,184,345 | 2/1993 | Sahni | 379/53 |
| 5,189,632 | 2/1993 | Paajanen et al. | 379/110 |

FOREIGN PATENT DOCUMENTS

| | | |
|---|---|---|
| 0172473 | 2/1986 | European Pat. Off. . |
| 0382601 | 8/1990 | European Pat. Off. ........... 379/53 |
| 3828485 | 3/1990 | Germany . |
| 62-091045 | 4/1987 | Japan . |
| 63-151283 | 6/1988 | Japan . |
| 1160286 | 6/1989 | Japan . |
| 2055488 | 2/1990 | Japan . |
| 0113656 | 4/1990 | Japan ........... 379/53 |
| 0113657 | 4/1990 | Japan ........... 379/53 |
| 0218251 | 8/1990 | Japan ........... 379/53 |
| 3053785 | 3/1991 | Japan . |
| 3136487 | 6/1991 | Japan . |
| 0504550 | 1/1993 | Japan ........... 379/53 |
| 2242335 | 3/1990 | United Kingdom . |

OTHER PUBLICATIONS

Kummerow et al., "Bildtelefon–ein Kommunikationsdienst im ISDN ab 1991," 8189 Telenorma Nachrichten (1989) No. 93, Frankfurt, Germany, pp. 52–53.
"Mobilfunk" 1 (1988), No. 1, p. 14.
"Hand-held Videophone" Popular Science, Feb. 1992.
Philips SA620 Integrated Wireless "1993" Philips Semiconductors.
"AT&T Videophone" USA Today, Jan. 1, 1993.

*Primary Examiner*—Stephen Chin
*Assistant Examiner*—Vijay Shankar
*Attorney, Agent, or Firm*—Spencer, Frank & Schneider

[57] ABSTRACT

A radiotelephone device has a telephone handset-shaped housing for hand-held operation. The device includes electroacoustic transducers mounted at sound apertures in the housing, a keypad mounted between the apertures, and electronic circuitry. Video communication is accomplished by a video camera mounted in the housing and connected with the electronic circuitry and a liquid crystal display device mounted in the housing and connected to the electronic circuitry. Thus a radiotelephone is equipped with a video pickup device and a video display device.

15 Claims, 1 Drawing Sheet

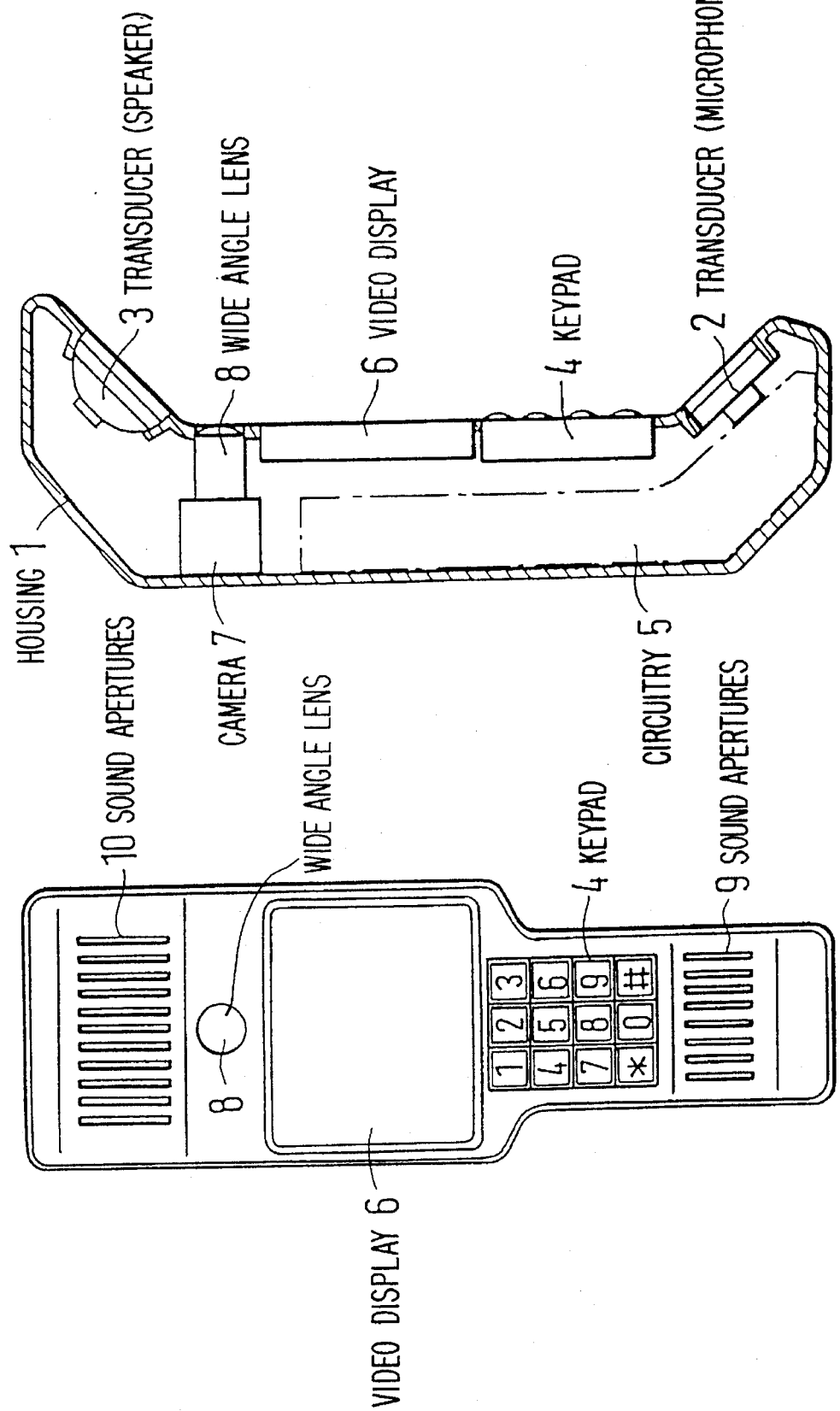

HAND-HELD RADIOTELEPHONE WITH VIDEO TRANSMISSION AND DISPLAY

This application is a continuation of application Ser. No. 07/913,397, filed Jul. 15, 1992 (now abandoned).

BACKGROUND OF THE INVENTION

1. Field of the Invention

The present invention relates to a radiotelephone.

2. Background Information

Such a radiotelephone is described, for example, in the journal "Mobilfunk" 1 (1988), No. 1, page 14. The instrument has a rectangular-parallelepiped-shaped housing of the size of a handset which contains a transceiver, keys for dialing and function keys, a display, electroacoustic transducers, a power supply in the form of rechargeable batteries, and a large-scale-integrated electronic circuit. An antenna can be screwed to the top of the housing, and a slot is provided there for inserting an authorization card into a built-in card reader. The keys for dialing form an alphanumeric keyboard, and the electronics include a memory having great number of memory locations for subcriber numbers and names. For charge indication and various other service features, the instrument offers menu functions. Accessories for portable and mobile use in an automobile, such as car-mounting kit, carrying bag, battery charger, and hands-free facility, make is possible to untilize all advantages of a mobile radio network.

Also known are short-range radiotelephones, so-called cordless telephones, which have a base station, which is connected to the telecommunication network, and a cordless hand-held device, the latter containing all control keys and a storage battery, e.g., "sinus 1" or "sinus 2" of Deutsche Bundespost (prospectuses FTZ L 16-4, Order Nos. 210A and 210B, respectively). The base station is equipped with a charger which, when the hand-held device is on-hook, charges the battery, which, when fully charged, permits several hours of independence from the base station. Radio communication between base station and hand-held device is carried on numerous channels in the 900-MHz range.

SUMMARY OF THE INVENTION

The invention has for its object to further improve the range of application and convenience of a radiotelephone. This object is attained by providing a video pickup device and a video display device. Further advantageous features of the invention will become apparent from the Detailed Description. By the addition of video capability to the radiotelephone, communication is considerably improved and facilitated.

BRIEF DESCRIPTION OF THE DRAWINGS

The invention will now be described with the aid of an embodiment which is shown in the accompanying drawings in which:

FIGS. 1 and 2 show a mobile radiotelephone with video facility in the form of a hand-held device in a front view and a schematic longitudinal section, respectively.

DETAILED DESCRIPTION OF THE PREFERRED EMBODIMENTS

As is usual with radiotelephones, the mobile radiovideophone is designed as a hand-held device. Its housing 1 therefore has an easy-to-handle shape which resembles that of a telephone handset. As can be seen in FIG. 2, the two ends of the housing, where the electroacoustic transducers 2 and 3 are mounted behind corresponding sound apertures 9 and 10, may be inclined inwards to ensure good intelligibility. The housing may also have a prolate shape. The device is equipped with a hands-free facility. As usual, the housing 1 contains the following parts: microphone 2, loudspeaker 3, a keypad 4 therebetween, above the microphone 2, and, if required, further function keys (not shown) as well as the electronic circuit 5, indicated by a dash-and-dot line. The keys may also be arranged on the other side (outside) of the housing 1, i.e., on the side facing away from the sound apertures 9 and 10.

Above the keypad 4, a video display device 6 in the form of a flat liquid crystal display (LCD) is provided which, at least in this portion, determines the width of the housing 1. Above the video display device 6, the housing 1 contains a small camera 7 with a wide-angle lens 8 as a video pickup device. Thus, a radiovideophone for video and audio communication is provided which offers maximum independence and freedom of movement like mobile telephones but also has video capability.

For communication in the ISDN, two B channels are used, one for audio transmission and one for video transmission. In the C mobile-radio system, transmission takes place on two 32-kb/s channels. Alternatively, audio can be transmitted in the mobile radiotelephone network at 8 kb/s and video at 24 kb/s until higher bit rates are possible.

What is claimed is:

1. A hand-held telephone comprising:
   a hand-held housing having a front surface, at least two sound apertures disposed at the front surface and extending through the front surface into the hand-held housing;
   at least two electroacoustic transducers mounted within the hand-held housing behind corresponding ones of the at least two sound apertures of the front surface of the hand-held housing and facing away from the hand-held housing;
   a keypad mounted in the hand-held housing having keys which are accessible outside of the hand-held housing at the front surface of the hand-held housing;
   a liquid crystal display mounted in the hand-held housing and having a display face directed away from the hand-held housing viewable at the front surface of the hand-held housing;
   a video camera mounted in the hand-held housing directed away from the hand-held housing in the same direction as the display at the front surface of the hand-held housing; and
   electronic circuitry disposed within said hand-held housing and connected to the at least two electroacoustic transducers, the keypad, the display and the video camera, for transmitting and receiving signals with an external telephone network.

2. The telephone according to claim 1, wherein the hand-held housing is a hand-held telephone handset shaped housing.

3. The telephone according to claim 2, wherein the at least two sound apertures are disposed at opposite ends of the front surface of the hand-held telephone handset-shaped housing.

4. The telephone according to claim 3, wherein the keypad is mounted between the at least two electroacoustic transducers.

5. The telephone according to claim 4, wherein the liquid crystal display is mounted adjacent the keypad between the at least two electroacoustic transducers.

6. The telephone according to claim 5, wherein the video camera is mounted between the display and one of the at least two electroacoustic transducers.

7. The telephone according to claim 6, wherein the signals transmitted and received by the electronic circuitry contain at least audio and visual information.

8. The telephone according to claim 2, wherein the keypad is mounted between the at least two electroacoustic transducers.

9. The telephone according to claim 8, wherein the liquid crystal display is mounted adjacent the keypad between the at least two electroacoustic transducers.

10. The telephone according to claim 9, wherein the video camera is mounted between the display and one of the at least two electroacoustic transducers.

11. The telephone according to claim 10, wherein the signals transmitted and received by the electronic circuitry contain at least audio and visual information.

12. The telephone according to claim 2, wherein the liquid crystal display is mounted adjacent the keypad between the at least two electroacoustic transducers.

13. The telephone according to claim 12, wherein the video camera is mounted between the display and one of the at least two electroacoustic transducers.

14. The telephone according to claim 13, wherein the signals transmitted and received by the electronic circuitry contain at least audio and visual information.

15. The telephone according to claim 2, wherein the video camera is mounted between the display and one of the at least two electroacoustic transducers.

\* \* \* \* \*